US009226297B2

(12) United States Patent
Han

(10) Patent No.: US 9,226,297 B2
(45) Date of Patent: Dec. 29, 2015

(54) APPARATUS AND METHOD FOR NETWORK ENTRY IN A WIRELESS COMMUNICATION SYSTEM

(75) Inventor: Shuangfeng Han, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 315 days.

(21) Appl. No.: 13/531,308

(22) Filed: Jun. 22, 2012

(65) Prior Publication Data

US 2012/0327872 A1 Dec. 27, 2012

(30) Foreign Application Priority Data

Jun. 22, 2011 (KR) ........................ 10-2011-0060617

(51) Int. Cl.
*H04W 4/00* (2009.01)
*H04W 72/04* (2009.01)
*H04B 7/06* (2006.01)
*H04B 7/04* (2006.01)
*H04L 1/00* (2006.01)
*H01Q 3/28* (2006.01)

(52) U.S. Cl.
CPC ............... *H04W 72/046* (2013.01); *H01Q 3/28* (2013.01); *H04B 7/043* (2013.01); *H04B 7/0617* (2013.01); *H04L 1/0006* (2013.01)

(58) Field of Classification Search
CPC ........................... H04B 7/0617; H04B 7/0639
USPC ......................................................... 370/329
See application file for complete search history.

(56) References Cited

U.S. PATENT DOCUMENTS

| 8,005,060 | B2 | 8/2011 | Na et al. |
| 8,285,282 | B2 | 10/2012 | Joko et al. |
| 2008/0144751 | A1* | 6/2008 | Xia et al. ........................ 375/347 |
| 2008/0204319 | A1* | 8/2008 | Niu et al. ........................ 342/368 |
| 2010/0150127 | A1 | 6/2010 | Wang et al. |
| 2010/0197303 | A1 | 8/2010 | Joko et al. |
| 2010/0321237 | A1* | 12/2010 | Na et al. ......................... 342/373 |
| 2011/0155570 | A1 | 6/2011 | Senda et al. |
| 2012/0182897 | A1 | 7/2012 | Han |

FOREIGN PATENT DOCUMENTS

| KR | 20080045601 A | 5/2008 |
| KR | 20110004900 A | 1/2011 |
| WO | WO 2010000312 A1 * | 1/2010 ............. H04L 25/03 |

OTHER PUBLICATIONS

International Search Report dated Nov. 26, 2012 in connection with International Patent Application No. PCT/KR2012/003592, 3 pages.

(Continued)

*Primary Examiner* — Mark Rinehart
*Assistant Examiner* — Matthew Hopkins

(57) ABSTRACT

In one embodiment, a method for network entry in a wireless communication system includes acquiring ranging code configuration information, which represents the corresponding relationship among multiple beam vectors, multiple ranging sequences, and multiple ranging channels, determining an optimal downlink beam vector, and transmitting one of the ranging sequences corresponding to the optimal downlink beam vector to a Base Station (BS) through one of the ranging channels corresponding to the optimal downlink beam vector.

30 Claims, 6 Drawing Sheets

(56) References Cited

OTHER PUBLICATIONS

Written Opinion of International Searching Authority dated Nov. 26, 2012 in connection with International Patent Application No. PCT/KR2012/003592, 3 pages.

Caire, et al.; "Multiuser MIMO Achievable Rates with Downlink Training and Channel State Feedback"; IEEE Transactions on Information Theory, vol. 56, No. 6, Jun. 2010, pp. 2845-2866.

Partial Supplementary European Search Report dated Nov. 14, 2014 in connection with European Patent Application No. 12803206.7; 5 pages.

Extended European Search Report dated Mar. 13, 2015 in connection with European Patent Application No. 12803206.7; 11 pages.

Huawei, et al.; "Comparisoin of Transmission Schemes for CLTD"; 3GPP TSG RAN WG1 Mtg. #63bis; R1-110310;Dublin, IE; Jan. 17-21, 2011; 5 pages.

Text of the First Office Action dated Sep. 22, 2015 in connection with Chinese Patent Application No. 2012-800310539; 17 pages.

\* cited by examiner ly one operation of a device. The functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

APPARATUS AND METHOD FOR NETWORK ENTRY IN A WIRELESS COMMUNICATION SYSTEM

CROSS-REFERENCE TO RELATED APPLICATION(S) AND CLAIM OF PRIORITY

The present application is related to and claims the benefit under 35 U.S.C. §119(a) to a Korean patent application filed in the Korean Intellectual Property Office on Jun. 22, 2011 and assigned Serial No. 10-2011-0060617, the entire disclosure of which is hereby incorporated by reference.

TECHNICAL FIELD OF THE INVENTION

The present invention generally relates to network entry in a wireless communication system.

BACKGROUND OF THE INVENTION

Generally, wireless communication systems use microwave frequencies in the range of approximately 2 to 10 Giga Hertz (GHz). Conventional wireless communication systems, however, use frequencies with a relatively long wavelength such that these wireless communication systems mainly employ omnidirectional or low-directivity antennas. Examples of such communication systems include those conforming to the Worldwide Interoperability for Microwave Access (WiMAX), 3rd Generation Partnership Project Long Term Evolution (3GPP LTE).

With the gradually increasing demand for high transmission rates, systems using frequencies in a millimeter wave band are being taken into consideration. Compared to microwave frequencies, the millimeter wave band can provide a relatively high transmission rate. But, because attenuation increases with higher frequency, a high-directivity antenna or a beamforming technique is often used.

Generally, prior to communication, a terminal and a Base Station (BS) performs a network entry procedure. The network entry procedure includes processes of downlink synchronization acquisition, system information acquisition, time offset, frequency offset, power adjustment, and the like. When performing the first network entry, the BS and the terminal cannot determine an optimal beam vector due to lack of knowledge the others whereabouts. Accordingly, upon initial access, proper signaling performance may be difficult to achieve.

Accordingly, an alternative for improving the signaling performance in an initial network access process should be provided.

SUMMARY OF THE INVENTION

To address the above-discussed deficiencies of the prior art, it is a primary aspect of the present invention to provide an apparatus and method for, upon network entry, improving the performance of signaling in a wireless communication system.

Another aspect of the present invention is to provide an apparatus and method for determining an optimal beam vector in a wireless communication system.

A further aspect of the present invention is to provide an apparatus and method for determining an optimal beam vector using a ranging sequence and a ranging channel in a wireless communication system.

The above aspects are achieved by providing an apparatus and method for network entry in a wireless communication system.

According to one aspect of the present invention, a method of a terminal in a wireless communication system includes acquiring ranging code configuration information, which represents the corresponding relationship among multiple beam vectors, multiple ranging sequences, and multiple ranging channels, determining an optimal downlink beam vector, and transmitting one of the ranging sequences corresponding to the optimal downlink beam vector to a Base Station (BS) through one of the ranging channels corresponding to the optimal downlink beam vector.

According to another aspect of the present invention, a method of a BS in a wireless communication system is provided. The method includes transmitting ranging code configuration information, which represents the corresponding relationship among multiple beam vectors, multiple ranging sequences, and multiple ranging channels, performing receive (RX) beamforming for signals received through the ranging channels using each beam vector corresponding to each of the ranging channels, and, when a ranging sequence transmitted by a terminal is detected, determining at least one optimal transmission beam vector and at least one optimal reception beam vector according to the detected ranging sequence and one ranging channel in which the ranging sequence is detected.

According to a further another aspect of the present invention, a terminal configured for a wireless communication system is provided. The apparatus includes a controller and a modulator/demodulator (modem). The controller is configured to acquire ranging code configuration information, which represents the corresponding relationship among multiple beam vectors, multiple ranging sequences, and multiple ranging channels, and determine an optimal downlink beam vector. The modem is configured to transmit one of ranging sequences corresponding to the optimal downlink beam vector to a BS through one of the ranging channels corresponding to the optimal downlink beam vector.

According to yet another aspect of the present invention, a BS configured for a wireless communication system includes a modem, a beamforming unit, and a controller. The modem is configured to transmit ranging code configuration information, which represents the corresponding relationship among multiple beam vectors, multiple ranging sequences, and multiple ranging channels. The beamforming unit is configured to perform RX beamforming for signals received through ranging channels using each beam vector corresponding to each of the ranging channels. If a ranging sequence transmitted by a terminal is detected, the controller is configured to determine at least one optimal transmission beam vector and at least one optimal reception beam vector according to the detected ranging sequence and one ranging channel in which the ranging sequence is detected.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

Figure 1:
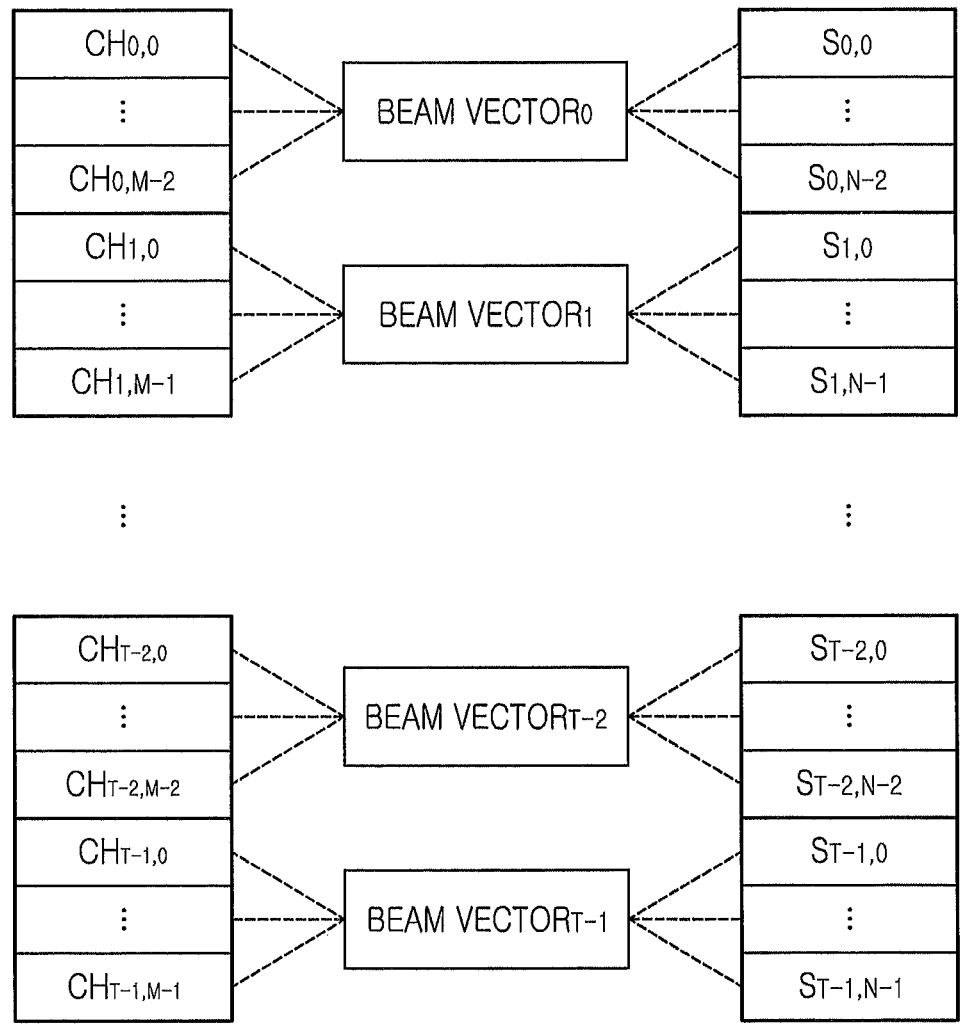
FIG. 1 illustrates an example ranging code configuration in a wireless communication system according to an embodiment of the present invention.

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications system.

The present invention is directed to performing network entry in a wireless communication system. Below, the present invention describes a technology for, upon network entry, improving the signaling performance in a wireless communication system. Below, the present invention describes, for example, an Orthogonal Frequency Division Multiplexing/Orthogonal Frequency Division Multiple Access (OFDM/OFDMA) wireless communication system. For description convenience, the present invention uses the terms and names defined in the Institute of Electrical and Electronics Engineers (IEEE) 802.16 standard. However, the present invention is not limited by the terms and names, and can be identically applied to systems following other standards.

One embodiment of the initial network entry is performed as follows.

First, a terminal acquires downlink physical synchronization for a Base Station (BS). After that, the terminal receives system information broadcasted by the BS, and acquires parameters for initial network entry included in the system information. For example, the parameters for the initial network entry can include ranging code configuration information. Additionally, the terminal performs initial ranging.

Ranging is a procedure for adjusting accurate time offset, frequency offset, and transmit power. For ranging, a BS indicates a ranging channel and ranging code configuration information. A terminal which intends to gain access to the BS performs the ranging according to the indication of the BS. In detail, the terminal transmits a ranging code, and the BS detects the ranging code. If the ranging code is detected, the BS determines which code has been received and, according to the code detection result, the BS provides a parameter for adjustment of the time offset, the frequency offset, and the transmit power, to the terminal.

The present invention has the following features.

A synchronization channel is subjected to sector beamforming or forms a narrow beam. A preamble transmitted through the synchronization channel indicates a sector IDentifier (ID) and a beam ID. A ranging sequence of a terminal is transmitted through an omnidirectional antenna. That is, the terminal transmits the ranging sequence without beamforming. Upon ranging signal reception, a BS performs receive (RX) beamforming. However, although the terminal performs ranging without beamforming, if the terminal fails in the ranging, the terminal can transmit a ranging sequence through the beamforming. In a Time Division Duplex (TDD) system, the present invention has reciprocity between an uplink channel and a downlink channel. Accordingly, an optimal downlink beam vector is the same as or similar to an optimal uplink beam vector. The terminal and the BS share a codebook, and the codebook includes a plurality of beam vectors. The beam vectors included in the codebook are denoted as a codebook entry. The codebook entry forms one beam.

A ranging procedure according to one embodiment of the present invention is performed as follows.

A terminal determines an optimal downlink beam vector. For instance, the terminal can estimate a downlink channel through a synchronization channel, and determine an optimal beam vector based on the estimated channel. For another instance, the terminal can determine an optimal downlink beam vector according to a beam ID indicated by a preamble having the highest signal strength.

For ranging, the terminal transmits a ranging sequence through a ranging channel. At this time, the ranging channel and the ranging sequence are selected according to the optimal downlink beam vector. The ranging channel, the ranging sequence, and the codebook entry are in a corresponding relationship, and ranging code configuration information representing the corresponding relationship is broadcasted from the BS. For instance, a ranging code configuration is illustrated as in FIG. 1.

FIG. 1 illustrates an example ranging code configuration in a wireless communication system according to one embodiment of the present invention.

Referring to FIG. 1, the number of ranging channels included in one unit interval is a (T×M) number. For instance, the unit interval can be a superframe. The number of ranging sequences is a (T×N) number. Here, 'T' denotes the number of codebook entries. That is, different beams of the number of codebook entries 'T' can be made. Codebook entries 'T' each correspond to ranging channels of a number 'M' and ranging sequences of a number 'N'. That is, ranging channels of the (T×M) number and ranging sequences of the (T×N) number each are divided into the number 'T' of subsets. Each subset corresponds to one beam vector. The corresponding relationship between the ranging sequence and the beam vector is used for determining an optimal downlink beam vector, and the corresponding relationship between the ranging channel and the beam vector is used for determining an optimal uplink beam vector.

With reference to the corresponding relationship, the terminal selects one of the ranging channels corresponding to the optimal downlink beam vector and one of the ranging sequences corresponding thereto, and transmits the selected ranging sequence through the selected ranging channel without beamforming. The BS performs receive (RX) beamforming using a corresponding beam vector in each ranging channel according to the corresponding relationship, and attempts to detect a ranging signal. If the ranging signal is detected, the BS identifies a ranging sequence of the detected ranging signal and a ranging channel thereof. Accordingly, the BS can be aware of an optimal downlink beam vector determined by the terminal through the identified ranging sequence. Also, the BS can determine an optimal uplink reception beam vector through the identified ranging channel. Also, the BS can estimate an uplink channel using a reference signal received from the terminal, and can determine an optimal uplink transmission beam vector based on the estimated channel. Accordingly, the BS transmits a notification of the optimal uplink transmission beam vector to the terminal.

A first embodiment of the present invention is applied when assuming that the optimal downlink beam vector selected by the terminal is an optimal uplink beam vector. In this case, if the BS successfully receives a terminal's ranging signal by not applying uplink transmit (TX) beamforming, the BS determines the optimal downlink beam vector selected by the terminal as an optimal uplink transmission beam vector. This is the same as determining a beam vector corresponding to the ranging channel in which the ranging sequence is detected, as the optimal uplink beam vector.

A second embodiment of the present invention is applied when assuming that the optimal downlink beam vector selected by the terminal or a beam vector similar to the optimal downlink beam vector is an optimal uplink beam vector. In this case, the terminal repeatedly transmits the same ranging sequence through a ranging channel corresponding to an optimal downlink beam vector and ranging channels adjacent to the ranging channel corresponding to the optimal downlink beam vector. The BS determines a beam vector corresponding to a ranging channel in which a ranging sequence is detected as the optimal uplink beam vector.

Although the aforementioned procedure has been performed, if the BS fails to detect the ranging sequence, an additional procedure for determining an uplink transmission beam vector is carried out as follows.

The terminal transmits beamformed ranging sequences corresponding to an optimal downlink beam vector using each codebook entry, and transmits the transmit beamformed ranging sequences through ranging channels corresponding to the optimal downlink beam vector, respectively. At this time, the predefined corresponding relationship between the ranging sequence and the codebook entry that is used for the TX beamforming is applied. For example, a ranging sequence ($S_{T,0}$) can be transmit beamformed to a beam vector$_0$, and a ranging sequence ($S_{T,1}$) can be transmit beamformed to a beam vector$_1$.

If one of a plurality of transmit beamformed ranging sequences is detected successfully, the BS determines an optimal downlink beam vector according to a subset of the detected ranging sequence, determines an optimal uplink transmission beam vector according to an index within the subset of the detected ranging sequence, and determines an optimal uplink reception beam vector according to a subset of a ranging channel in which the ranging sequence is detected. At this time, the BS having detected the ranging sequence transmits a message to the terminal. The message includes the detected ranging sequence. According to this, the terminal can be aware of the ranging sequence detected by the BS, and determines a beam vector having been applied to the detected ranging sequence as the optimal uplink transmission beam vector.

On the other hand, if no ranging sequence is detected in the BS, the terminal again performs the aforementioned procedure through ranging channel subsets corresponding to other beam vectors. However, to inform the BS of the optimal downlink beam vector, the terminal uses the ranging sequences corresponding to the optimal downlink beam vector.

The present invention estimates that a terminal needing the TX beamforming would have a low channel quality. Accordingly, in order to represent if the terminal has the low channel quality, the present invention classifies ranging channels according to channel quality. For instance, the ranging channels can be classified as illustrated in FIG. 2.

Figure 2:
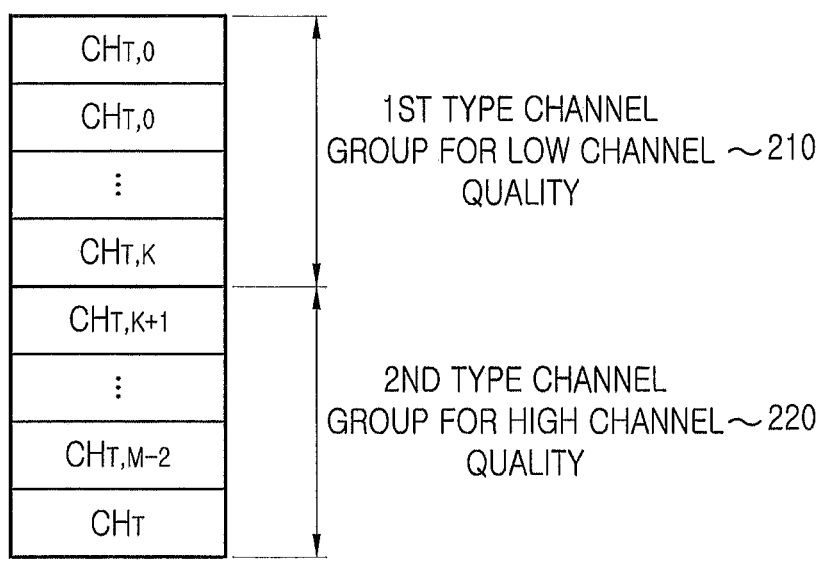
FIG. 2 illustrates an example division of a ranging channel in a wireless communication system according to an embodiment of the present invention.

FIG. 2 illustrates an example division of a ranging channel in a wireless communication system according to an embodiment of the present invention.

Referring to FIG. 2, within one ranging channel subset, the (K+1) number of ranging channels are classified as a 1st type channel group 210 having low channel quality, and the (M−K−1) number of remnant ranging channels that are classified as a 2nd type channel group (220) having high channel quality. That is, the 1st type channel group includes ranging channels allocated for performing uplink TX beamforming, and the 2nd type channel group includes ranging channels allocated for not performing uplink TX beamforming. Accordingly, if a ranging sequence is detected in the ranging channel belonging to the 2nd type channel group 220, the BS recognizes that a corresponding terminal does not perform TX beamforming, and determines an optimal downlink beam vector according to the ranging sequence and an optimal uplink beam vector according to the ranging channel in which the ranging sequence is detected. On the other hand, if the BS detects a ranging sequence in the ranging channel within the 1st type channel group 210, the BS recognizes that a corresponding terminal performs TX beamforming, and determines an optimal downlink beam vector according to the ranging sequence.

Operations and construction of an example terminal performing ranging and a BS as above according to one embodiment of the present invention are described below with reference to the drawings.

Figure 3:
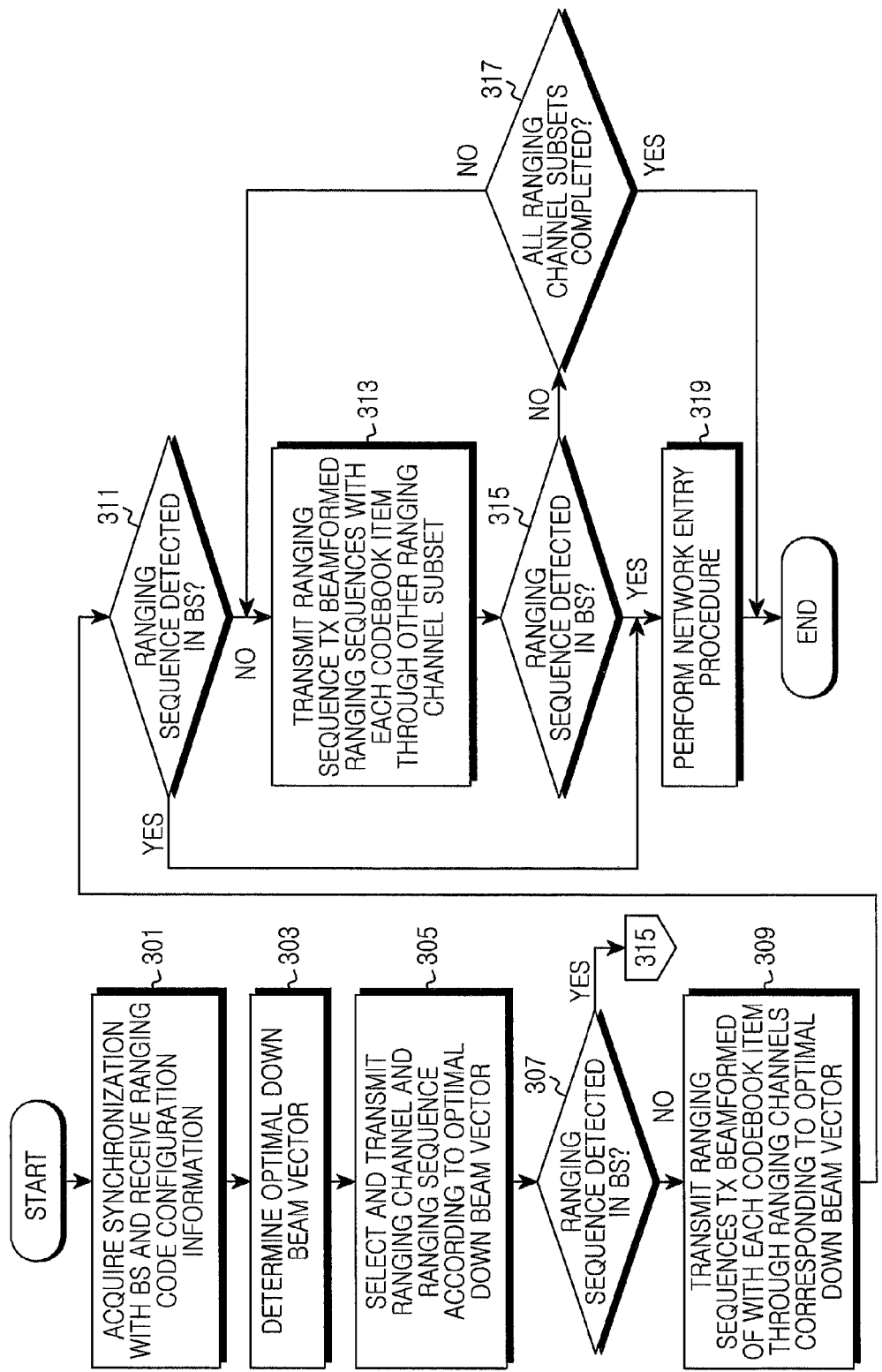
FIG. 3 illustrates an example operation procedure of a terminal in a wireless communication system according to an embodiment of the present invention.

FIG. 3 illustrates an example operation procedure of a terminal in a wireless communication system according to an embodiment of the present invention.

Referring to FIG. 3, in step 301, the terminal acquires downlink synchronization with a BS, and receives information informing the terminal of a ranging code configuration. That is, the terminal may acquire synchronization by detecting a preamble signal of the BS. The information informing the terminal of the ranging code configuration can be broadcasted as system information from the BS. In this case, the terminal can receive the information associated with the ranging code configuration by receiving a message, which includes the system information, transmitted in a fixed position on a frame.

Next in step 303, the terminal determines an optimal downlink beam vector. For example, the terminal can estimate a downlink channel through the preamble and, based on the estimated channel, select one of codebook entries having the optimal downlink beam vector. For another example, the terminal can determine a beam vector indicated by a beam ID indicated by the detected preamble as the optimal downlink beam vector.

After determining the optimal downlink beam vector, the terminal transmits one of ranging sequences corresponding to the optimal downlink beam vector through one of ranging channels corresponding to the optimal downlink beam vector in step 305. At this time, the terminal can be aware of the corresponding relationship among the beam vectors, the ranging channels, and the ranging sequences through the ranging code configuration. According to another embodiment, the terminal can additionally transmit the ranging sequence through ranging channels adjacent to the ranging channel corresponding to the optimal downlink beam vector. For instance, the adjacent ranging channels used can be two in number. At this time, the terminal uses ranging channels belonging to a 2nd type channel group allocated for high channel quality.

After that in step 307, the terminal determines if the transmitted ranging sequence is detected by the BS. If the BS succeeds in detecting the ranging sequence, the BS transmits a message including the detected ranging sequence to the terminal. Accordingly, the terminal can determine a success or failure of detection of the ranging sequence through the message. That is, if the message is not confirmed within a specified time during which the transmission of the ranging sequence and a response is received, the terminal determines a failure of the detection of the ranging sequence. For instance, the message can be one of a message allocating a resource for transmission of a ranging message, and a message including a parameter for time offset, frequency offset, and power adjustment.

If the BS fails in detecting the ranging sequence, the terminal transmit beamforms each of the ranging sequences corresponding to the optimal downlink beam vector using each codebook entry and then, transmits the beamformed ranging sequences through the ranging channels corresponding to the optimal downlink beam vector, respectively in step 309. At this time, the terminal uses ranging channels belonging to a 1st type channel group allocated for low channel quality.

Next in step 311, the terminal determines if at least one of the transmit beamformed and transmitted ranging sequences is detected by the BS. If the BS succeeds in detecting the ranging sequence, the BS transmits a message including the detected ranging sequence to the terminal. Accordingly, the terminal can determine a success or failure of the ranging sequence through the message. Also, the terminal can determine a beam vector, which has been applied to the detected ranging sequence as an optimal uplink transmission beam vector.

If the BS fails in detecting all the ranging sequences, the terminal transmit beamforms each of the ranging sequences corresponding to the optimal downlink beam vector using each codebook entry and then, transmits the beamformed ranging sequences through ranging channels corresponding to beam vectors other than the optimal downlink beam vector, respectively in step 313. At this time, the terminal uses the ranging channels belonging to the 1st type channel group allocated for the low channel quality.

Next in step 315, the terminal determines if at least one of the transmit beamformed and transmitted ranging sequences is detected by the BS. If the BS fails in detecting all the ranging sequences, the terminal determines if it has completed transmission of the beamformed ranging sequences for all ranging channel subsets in step 317. In other words, the terminal determines if a ranging channel subset not having transmitted the beamformed ranging sequences exists. If it is determined that the terminal has completed transmission of the beamformed ranging sequences for all the ranging channel subsets, the terminal terminates the procedure. On the other hand, if it is determined that a ranging channel subset not having transmitted the beamformed ranging sequences exists, the terminal continues processing at step 313 to determine another ranging channel subset.

If the BS succeeds in detecting the ranging sequence in steps 307, 311, and 315, the terminal performs a network entry procedure in step 319. For example, the terminal can adjust time offset, frequency offset, and transmit power according an indication provided by the BS, and perform other procedures, such as a capability negotiation procedure, a registration procedure, and the like. At this time, if the BS succeeds in detecting the ranging sequence in steps 311 or 315, the terminal can determine a beam vector, which has been applied to the detected ranging sequence, as an optimal uplink transmission beam vector. If the BS succeeds in detecting the ranging sequence in step 307 (not illustrated) the terminal can determine an optimal uplink transmission beam vector according to a notification from the BS. Accordingly, the terminal can use the optimal uplink transmission beam vector at the time of the network entry procedure performance.

Figure 4:
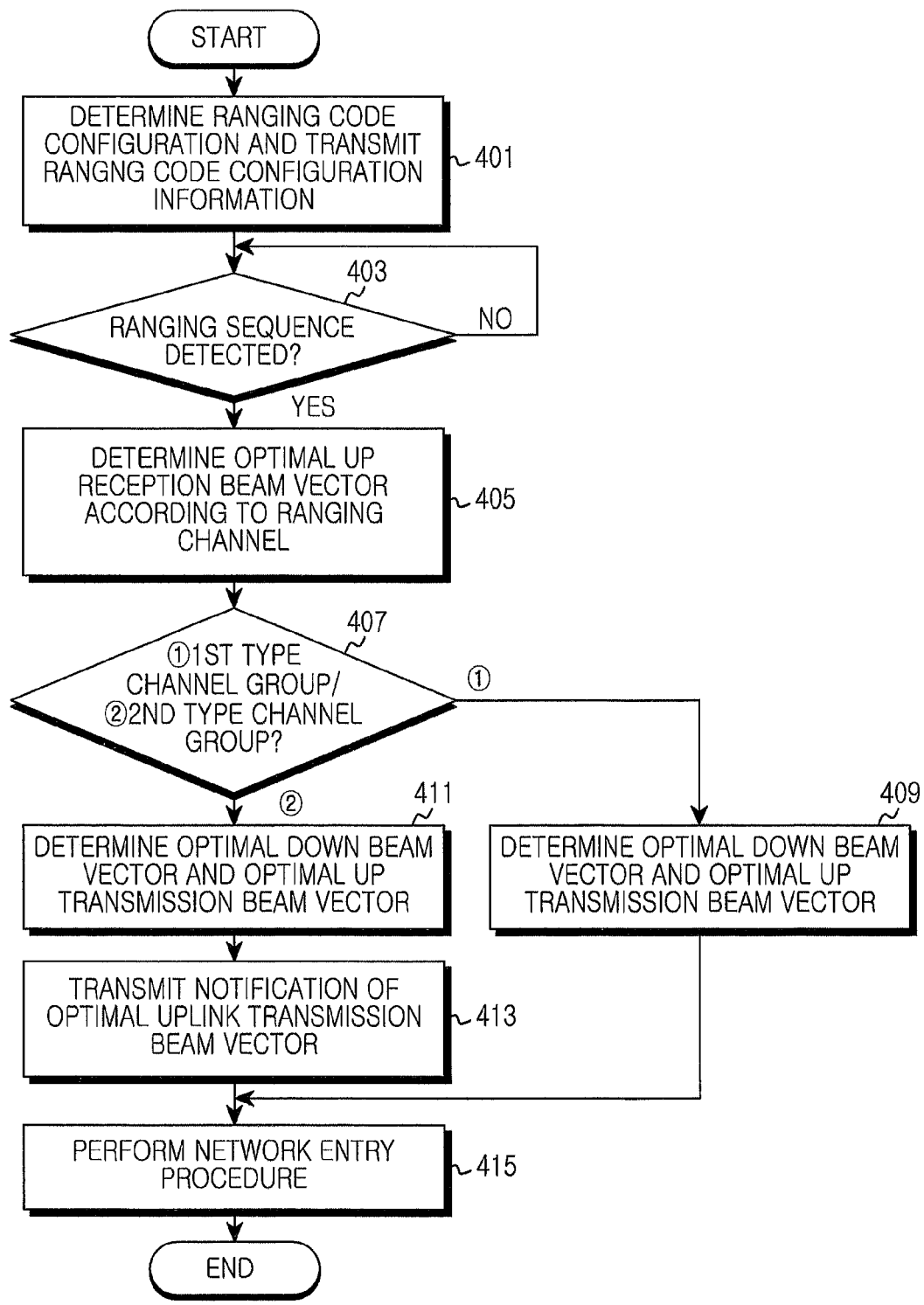
FIG. 4 illustrates an example operation procedure of a Base Station (BS) in a wireless communication system according to an embodiment of the present invention.

FIG. 4 illustrates an example operation procedure of a BS in a wireless communication system according to an embodiment of the present invention.

Referring to FIG. 4, in step 401, the BS determines a ranging code configuration, and broadcasts information informing the ranging code configuration. The information informing the ranging code configuration can be broadcasted as system information of the BS. In this case, the BS periodically transmits a message, which includes the system information in a fixed position on a frame.

After that in step 403, the BS determines if a ranging signal is detected. That is, the BS attempts to detect the ranging signal in all ranging channels. At this time, the BS receive beamforms signals, which are received through ranging channels, using a corresponding beam vector according to the corresponding relationship between a beam vector defined in the ranging code configuration and the ranging channel.

If it is determined in step 403 that the ranging signal is detected, the BS identifies a ranging channel in which the ranging signal is detected and, according to the identified ranging channel, determines an optimal uplink reception beam vector in step 405. That is, the BS determines a beam vector corresponding to a subset of the ranging channel as the optimal uplink reception beam vector.

Next in step 407, the BS determines if the ranging channel in which the ranging signal is detected belongs to a 1st type channel group or a 2nd type channel group. The 1st type channel group includes ranging channels used when a terminal performs TX beamforming, and the 2nd type channel group includes ranging channels used when the terminal does not perform the TX beamforming.

If it is determined in step 407 that the ranging channel belongs to the 1st type channel group, the BS identifies a ranging sequence of the ranging signal, determines an optimal downlink beam vector determined by the terminal through a subset of the identified ranging sequence, and determines an optimal uplink transmission beam vector through an index within the subset of the identified ranging sequence in step 409. That is, the BS determines a beam vector corresponding to the subset of the identified ranging sequence as the optimal downlink beam vector, and determines a beam vector corresponding to the index within the subset of the identified ranging sequence, as the optimal uplink transmission beam vector.

On the other hand, if it is determined in step 407 that the ranging channel belongs to the 2nd type channel group, the BS identifies a ranging sequence of the ranging signal, and determines an optimal downlink beam vector determined by the terminal through a subset of the identified ranging sequence in step 411. That is, the BS determines a beam vector corresponding to the subset of the identified ranging sequence as an optimal downlink beam vector. Also, the BS estimates an uplink channel using a reference signal received from the terminal and, based on the estimated channel, determines an optimal uplink transmission beam vector.

Next in step 413, the BS transmits a notification of the optimal uplink transmission beam vector to the terminal. After that in step 415, the BS proceeds with a network entry procedure. For example, the BS can transmit parameters for time offset, frequency offset, and transmit power adjustment to the terminal, and perform a capability negotiation procedure, a registration procedure, and the like.

Figure 5:
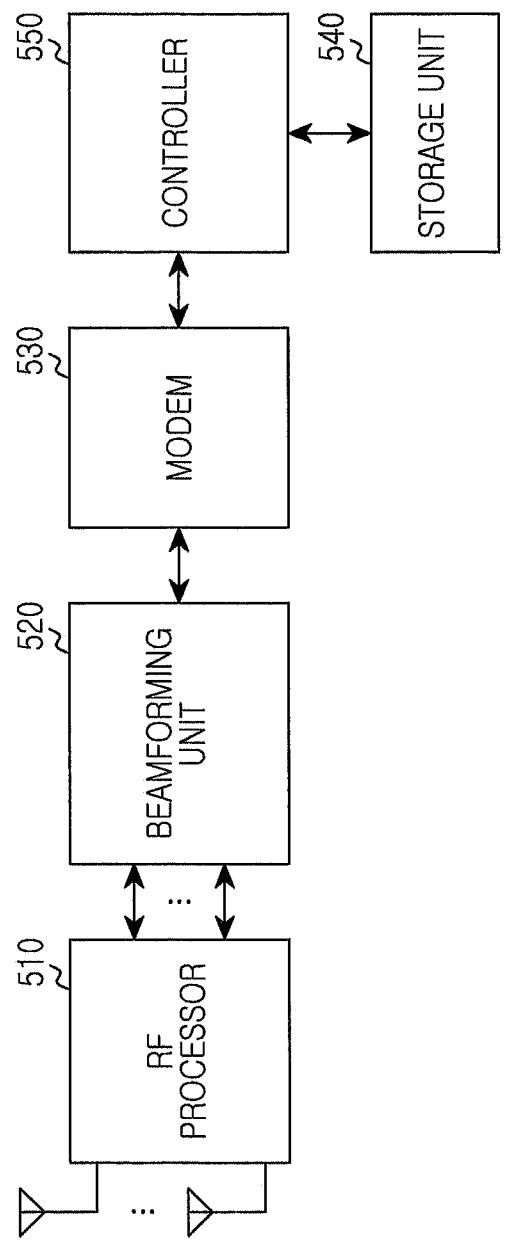
FIG. 5 illustrates an example construction of a terminal in a wireless communication system according to an embodiment of the present invention.

FIG. 5 illustrates an example construction of a terminal in a wireless communication system according to an embodiment of the present invention.

As illustrated in FIG. 5, the terminal includes a Radio Frequency (RF) processor 510, a beamforming unit 520, a modulator/demodulator (modem) 530, a storage unit 540, and a controller 550.

The RF processor 510 exchanges signals through a wireless channel that includes functions, such as signal band conversion, amplification, and the like. That is, the RF processor 510 up converts baseband signals into RF band signals and then transmits the RF band signals through one or more antennas, and down converts RF band signals received through the antennas into baseband signals. The RF processor 510 can include RF chains for a plurality of transmit/receive antennas, and each RF chain can include an amplifier, a mixer, an oscillator, a Digital to Analog Converter (DAC), an Analog to Digital Converter (ADC), and the like.

The beamforming unit 520 performs TX beamforming or RX beamforming using a beam vector. The beamforming unit 520 determines the performance or non-performance of beamforming and a beam vector to be used according to control by the controller 550. That is, the beamforming unit 520 multiplies a transmitted signal stream by the beam vector or multiplies a received signal stream by the beam vector according to control by the controller 550.

The modem 530 converts the signals between a baseband signal and a bit stream according to a physical layer standard of the system. For example, according to an OFDM scheme, at data transmission, the modem 530 creates complex symbols by encoding and modulating a transmission bit stream, maps the complex symbols to subcarriers, and then constructs OFDM symbols through Inverse Fast Fourier Transform (IFFT) operation and Cyclic Prefix (CP) insertion. Also, at data reception, the modem 530 divides a baseband signal provided via the beamforming unit 520 from the RF processor 510 in the unit of OFDM symbol, restores signals mapped to subcarriers through Fast Fourier Transform (FFT) operation, and restores a reception bit stream through demodulation and decoding. Also, the modern 530 detects a preamble signal for synchronization acquisition.

The storage unit 540 stores data including an executable program for operation of the terminal, system information, user traffic information, setup information, and the like. Particularly, the storage unit 540 stores ranging code configuration information received from the BS and a codebook. The ranging code configuration information includes information about the division of a use of ranging sequences. A ranging channel, a ranging sequence, and a codebook entry include information about the mutual corresponding relationship, such as, for example, the ranging code configuration as illustrated as in FIG. 1.

The controller 550 controls the general functions of the terminal. For example, the controller 550 creates transmission packets and provides the created packet to the modem 530, and interprets a reception packets provided from the modem 530. According to one embodiment, the controller 550 controls the progress of the network entry procedure. Specifically, the controller 550 transmits a ranging signal according to the beamforming process. An example operation of the controller 550 to perform one embodiment of the network entry procedure is provided as follows.

First, the controller 550 determines an optimal downlink beam vector. For example, the controller 550 can estimate a downlink channel through the preamble and, based on the estimated channel, select one of codebook entries as the optimal downlink beam vector. For another example, the controller 550 can determine a beam vector indicated by a beam ID indicated by the detected preamble as the optimal downlink beam vector. After determining the optimal downlink beam vector, the controller 550 selects one of the ranging channels corresponding to the optimal downlink beam vector and one of the ranging sequences corresponding to the optimal downlink beam vector with reference to the ranging code configuration information stored in the storage unit 540. The controller 550 then controls the modem 530, the beamforming unit 520, and the RF processor 510 to transmit the selected ranging sequence through the selected ranging channel. According to another embodiment, the controller 550 can additionally transmit ranging sequences through ranging channels adjacent to the ranging channel corresponding the optimal downlink beam vector. If the BS succeeds in detecting the ranging sequence, the controller 550 proceeds with the remnant network entry procedure.

On the other hand, if the BS fails in detecting the ranging sequence, the controller 550 transmit beamforms each of the ranging sequences corresponding to the optimal downlink beam vector using each codebook entry, and controls the modem 530, the beamforming unit 520, and the RF processor 510 to transmit the beamformed ranging sequences through the ranging channels corresponding to the optimal downlink beam vector, respectively. At this time, the modem 530 uses ranging channels belonging to a 1st type channel group allocated for low channel quality. If at least one of the transmit beamformed and transmitted ranging sequences is detected by the BS, the controller 550 proceeds with the remnant network entry procedure.

On the other hand, if the BS fails to detect all the transmit beamformed ranging sequences, the controller 550 controls to transmit beamform each of the ranging sequences corresponding to the optimal downlink beam vector using each codebook entry and then, transmit the beamformed ranging sequences through ranging channels corresponding to beam vectors other than the optimal downlink beam vector, respectively. If the BS again fails in detecting all the ranging sequences, the controller 550 repeats the aforementioned operation for other ranging channel subsets. In the process of repeating the aforementioned operation, if at least one of the transmit beamformed and transmitted ranging sequences is detected by the BS, the controller 550 proceeds with the remnant network entry procedure. On the other hand, although the aforementioned operation is repeated for all the ranging channel subsets, if the BS fails in detecting all the ranging sequences, the controller 550 determines a failure of network entry.

Figure 6:
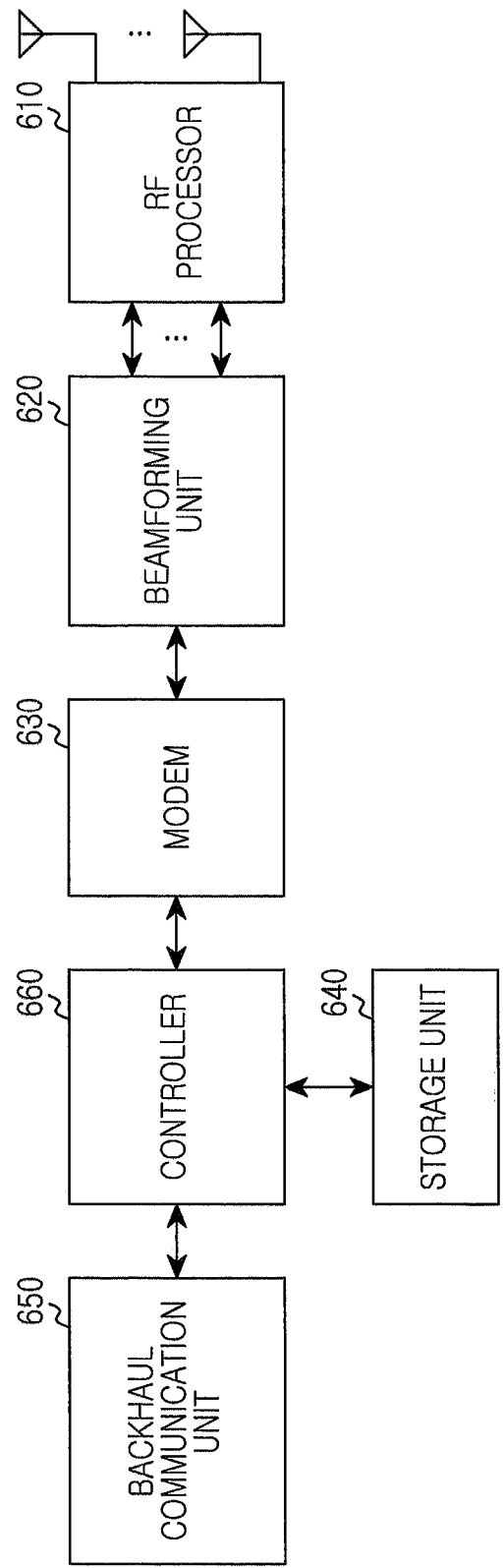
FIG. 6 illustrates an example construction of a BS in a wireless communication system according to an embodiment of the present invention.

FIG. 6 illustrates an example construction of a BS in a wireless communication system according to an embodiment of the present invention.

As illustrated in FIG. 6, the BS includes an RF processor 610, a beamforming unit 620, a modem 630, a storage unit 640, a backhaul communication unit 650, and a controller 660.

The RF processor 610 exchanges signals through a wireless channel using functions, such as signal band conversion, amplification, and the like. That is, the RF processor 610 up converts baseband signals provided from the modem 630 into RF band signals and then transmits the RF band signals through one or more antennas, and down converts RF band signals received through the antennas into baseband signals. The RF processor 610 can include RF chains for a plurality of transmit/receive antennas, and each RF chain can include an amplifier, a mixer, an oscillator, a DAC, an ADC, and the like.

The beamforming unit 620 performs TX beamforming or RX beamforming using beam vectors. The beamforming unit 620 determines the performance or non-performance of beamforming and a beam vector to be used according to the control of the controller 660. That is, according to the control of the controller 660, the beamforming unit 620 multiplies a transmitted signal stream by the beam vector or multiplies a received signal stream by the beam vector.

The modem 630 converts signals between baseband signals and bit streams according to a physical layer standard of the system. For example, according to an OFDM scheme, at data transmission, the modem 630 creates complex symbols by encoding and modulating a transmission bit stream, maps the complex symbols to subcarriers, and then constructs OFDM symbols through IFFT operation and CP insertion. Also, at data reception, the modem 630 divides a baseband signal provided from the RF processor 610 in the unit of OFDM symbols, restores signals mapped to subcarriers through FFT operation, and restores a reception bit stream through demodulation and decoding.

The storage unit 640 stores data including an executable program for an operation of the BS, system information, and the like. The storage unit 640 provides this stored data in response to requests by the controller 660. Particularly, the storage unit 640 stores data such as ranging code configuration information and a codebook. The ranging code configuration information includes information associated with the division of ranging sequences. A ranging channel, a ranging sequence, and a codebook entry include information about the mutual corresponding relationship, such as, for example, the ranging code configuration is illustrated as in FIG. 1.

The backhaul communication unit 650 provides an interface for the BS to perform communication with other nodes (e.g., other BSs, upper nodes, and the like) within a network. The backhaul communication unit 650 converts bit streams transmitted from the BS to the other nodes into physical signals, and converts physical signals received from the other nodes into bit streams.

The controller 660 controls the general operation of the BS. For example, the controller 660 creates transmission traffic packets and messages and provides them to the modem 630, and interprets reception traffic packets and messages provided from the modem 630. Also, the controller 660 creates and interprets messages for signaling with other nodes. Specifically, according to one embodiment, the controller 660 determines a ranging code configuration, and broadcasts information informing the terminal of the ranging code configuration. Also, according to another embodiment, the controller 660 controls the progress of the network entry procedure. Specifically, the controller 660 determines an optimal beam vector using a ranging signal received from a terminal. An example operation of the controller 660 for performing the network entry procedure is provided as follows.

If a ranging signal is detected, the controller 660 identifies a ranging channel in which the ranging signal is detected and, according to the identified ranging channel, determines an optimal uplink reception beam vector. That is, the controller 660 determines a beam vector corresponding to a subset of the ranging channel as the optimal uplink reception beam vector.

If the ranging channel in which the ranging signal is detected belongs to a 1st type channel group, the controller 660 identifies a ranging sequence of the ranging signal, determines an optimal downlink beam vector determined by the terminal through a subset of the identified ranging sequence, and determines an optimal uplink transmission beam vector through an index within the subset of the identified ranging sequence.

On the other hand, if the ranging channel in which the ranging signal is detected belongs to a 2nd type channel group, the controller 660 identifies a ranging sequence of the ranging signal, and determines an optimal downlink beam vector determined by the terminal through a subset of the identified ranging sequence. Also, the controller 660 estimates an uplink channel using a reference signal received from the terminal and, based on the estimated ranging channel, determines an optimal uplink transmission beam vector. Additionally, the controller 660 transmits a notification of the optimal uplink transmission beam vector to the terminal.

After that, the controller 660 proceeds with the remnant network entry procedure. For example, the controller 660 can transmit parameters for time offset, frequency offset, and transmit power adjustment to the terminal, and perform a capability negotiation procedure, a registration procedure, and the like.

It will be appreciated that embodiments of the present invention according to the claims and description in the specification can be realized in the form of hardware, software or a combination of hardware and software.

Any such software may be stored in a computer readable storage medium. The computer readable storage medium stores one or more programs (software modules), the one or more programs comprising instructions, which when executed by one or more processors in an electronic device, cause the electronic device to perform a method of the present invention.

Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present invention.

Accordingly, embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

As described above, certain embodiments of the present invention can improve the signaling performance upon network entry, by determining an optimal beam vector using a predefined corresponding relationship among a beam vector, a ranging channel, and a ranging sequence in a wireless communication system.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for operation of a terminal in a wireless communication system, the method comprising:
    receiving, from a base station, information regarding ranging sequences and ranging channels corresponding to each of a plurality of beam vectors;
    determining a ranging sequence and a ranging channel corresponding to a downlink beam vector determined by estimating a downlink channel; and
    transmitting the ranging sequence to the base station through the ranging channel.

2. The method of claim 1, further comprising:
    transmitting another ranging sequence corresponding to the downlink beam vector to the base station through another ranging channel corresponding to a beam vector adjacent to the downlink beam vector.

3. The method of claim 1, wherein the ranging sequence corresponding to the downlink beam vector is transmitted through one of the ranging channels allocated for not performing transmission beamforming.

4. The method of claim 1, further comprising:
    receiving a notification of an uplink beam vector from the base station.

5. The method of claim 1, further comprising:
    performing beamforming on at least one ranging sequence corresponding to the downlink beam vector using each of a plurality of codebook entries; and
    transmitting the beamformed ranging sequences through a first subset of the ranging channels corresponding to the downlink beam vector.

6. The method of claim 5, wherein the beamformed ranging sequences are transmitted through at least one ranging channel allocated for the transmission beamformed signals.

7. The method of claim 5, further comprising:
    receiving a message indicating one of the beamformed ranging sequences, that is detected by the base station; and
    determining a beam vector applied to a detected ranging sequence as an uplink beam vector.

8. The method of claim 5, further comprising:
    transmitting the beamformed ranging sequences through a second subset of the ranging channels other than the first subset of the ranging channels.

9. The method of claim 1, wherein determining the ranging sequence and the ranging channel comprises:
    estimating a downlink channel through a preamble received from the base station; and
    based on the estimated downlink channel, selecting one of a plurality of codebook entries as the downlink beam vector.

10. The method of claim 1, wherein determining the ranging sequence and the ranging channel comprises determining the downlink beam vector based on preambles from the base station.

11. A method for operating a base station in a wireless communication system, the method comprising:
    transmitting information regarding ranging sequences and ranging channels corresponding to each of a plurality of beam vectors;
    performing reception beamforming for signals received through the ranging channels using each of the beam vectors corresponding to each of the ranging channels; and
    if a ranging sequence transmitted by a terminal is detected, determining at least one beam vector for the terminal based on the detected ranging sequence and the ranging channel carrying the ranging sequence.

12. The method of claim 11, wherein determining the at least one beam vector comprises:
    determining, as an uplink beam vector, a beam vector corresponding to the ranging channel carrying the detected ranging sequence.

13. The method of claim 11, wherein determining the at least one beam vector comprises:
    if the detected ranging sequence is received through a ranging channel allocated for beamformed signals, determining a first beam vector corresponding to a subset of the ranging sequences including the detected ranging sequence as a downlink beam vector and a second beam vector corresponding to an index of the detected ranging sequence as an uplink beam vector.

14. The method of claim 11, wherein determining the at least one beam vector comprises:
    if the detected ranging sequence is received through a ranging channel allocated for transmission without transmission beamforming, determining a beam vector corresponding to the detected ranging sequence as a downlink beam vector.

15. The method of claim 14, further comprising:
    estimating an uplink channel using a reference signal received from the terminal;
    determining an uplink beam vector based on the estimated uplink channel; and
    transmitting a notification of the uplink beam vector to the terminal.

16. A terminal configured for a wireless communication system, the terminal comprising:
    a receiver configured to receive information, from a base station, regarding ranging sequences and ranging channels corresponding to each of a plurality of beam vectors;
    a controller configured to determine a ranging sequence and a ranging channel corresponding to a downlink beam vector determined by estimating a downlink channel; and
    a transmitter configured to transmit the ranging sequence to the base station through the ranging channel.

17. The terminal of claim 16, wherein the transmitter is further configured to transmit another ranging sequence corresponding to the downlink beam vector to the base station through another ranging channel corresponding to a beam vector adjacent to the downlink beam vector.

18. The terminal of claim 16, wherein the ranging sequence corresponding to the downlink beam vector is transmitted through one of the ranging channels allocated for not performing transmission beamforming.

19. The terminal of claim 16, wherein the receiver is configured to receive a notification of an uplink beam vector from the base station.

20. The terminal of claim 16, further comprising:

a beamforming unit configured to perform beamforming on at least one ranging sequence corresponding to the downlink beam vector using each of a plurality of codebook entries, and wherein the transmitter is further configured to transmit the beamformed ranging sequences through a first subset of the ranging channels corresponding to the downlink beam vector.

21. The terminal of claim 20, wherein the beamformed ranging sequences are transmitted through at least one ranging channel allocated for beamformed signals.

22. The terminal of claim 20, wherein the receiver is further configured to receive a message indicating one of the beamformed ranging sequences, which is detected by the base station, wherein the controller is configured to determine a beam vector applied to a detected ranging sequence as an uplink beam vector.

23. The terminal of claim 20, wherein the transmitter is further configured to transmit the beamformed ranging sequences through a second subset of the ranging channels other than the first subset of the ranging channels.

24. The terminal of claim 16, wherein the controller is further configured to:

estimate the downlink channel using a preamble received from the base station; and based on the estimated downlink channel, select one of a plurality of codebook entries as the downlink beam vector.

25. The terminal of claim 16, wherein the controller is further configured to determine the downlink beam vector based on preambles from the base station.

26. A base station in a wireless communication system, the base station comprising:

a transmitter configured to transmit information regarding ranging sequences and ranging channels corresponding to each of a plurality of beam vectors;

a beamforming unit configured to perform reception beamforming for signals received through the ranging channels using each beam vector corresponding to each of the ranging channels; and a controller configured to, if a ranging sequence transmitted by a terminal is detected, determine at least one beam vector for the terminal based on the detected ranging sequence and a ranging channel carrying the detected ranging sequence.

27. The base station of claim 26, wherein the controller is configured to determine, as an uplink beam vector, a beam vector corresponding to the ranging channel carrying the detected ranging sequence.

28. The base station of claim 26, wherein, if the detected ranging sequence is received through a ranging channel allocated for beamformed signals, the controller is configured to determine a first beam vector corresponding to a subset of the ranging sequences including the detected ranging sequence as a downlink beam vector and a second beam vector corresponding to an index of the detected ranging sequence as an uplink beam vector, wherein the index identifies the detected ranging sequences in the subset.

29. The base station of claim 26, wherein, if the detected ranging sequence is received through a ranging channel allocated for the transmission non-beamformed signals, the controller is configured to determine a beam vector corresponding to the detected ranging sequence as a downlink beam vector.

30. The base station of claim 26, wherein the controller is configured to estimate an uplink channel using a reference signal received from the terminal, determine an uplink beam vector based on the estimated uplink channel, and transmit a notification of the uplink beam vector to the terminal.

* * * * *